March 21, 1950  M. A. KENT  2,500,991
RAIN DEFLECTOR FOR VEHICLE VENTILATING WINDOWS
Filed Dec. 27, 1946
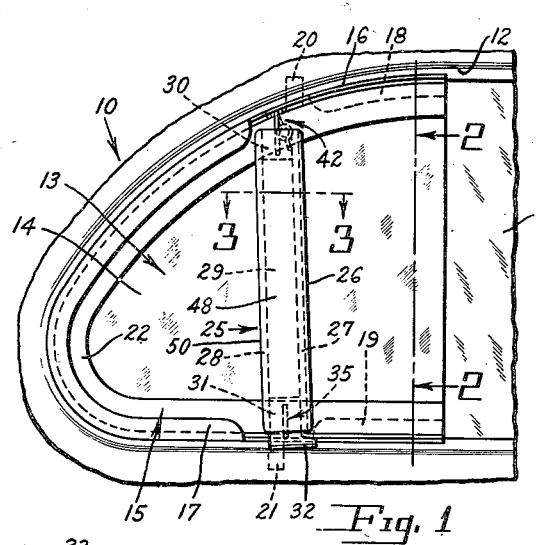
Fig. 1
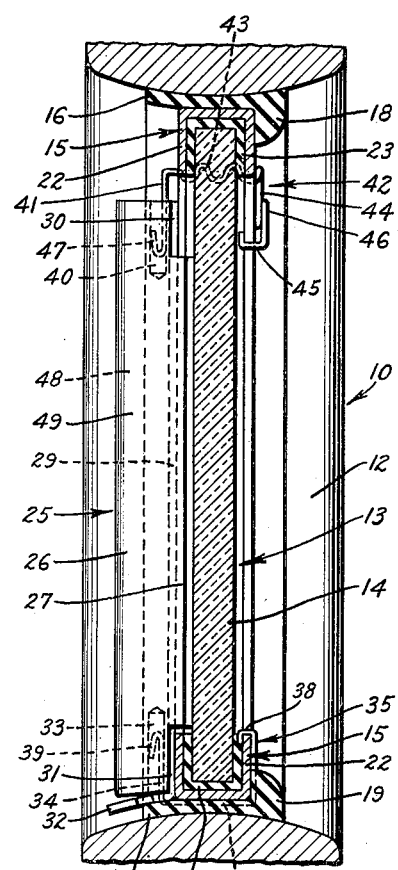
Fig. 2
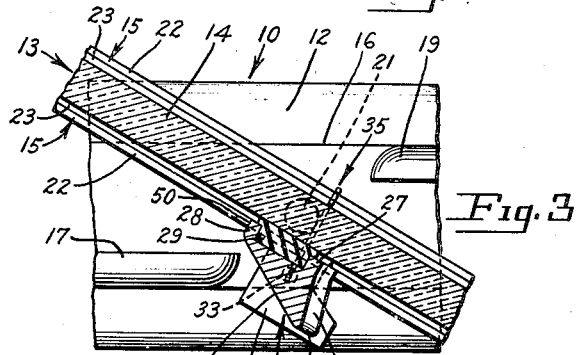
Fig. 3
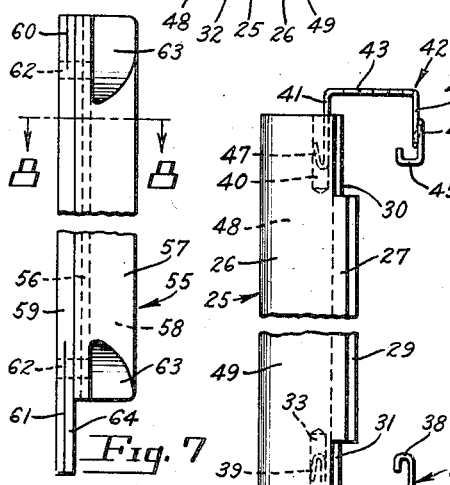
Fig. 7
Fig. 8
Fig. 4
Fig. 5
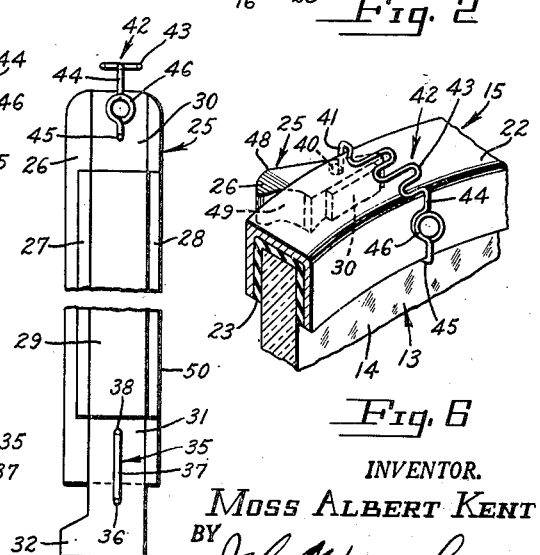
Fig. 6
INVENTOR.
MOSS ALBERT KENT
BY
*John H. Hanrahan*
ATTORNEY Patented Mar. 21, 1950

2,500,991

UNITED STATES PATENT OFFICE 2,500,991

RAIN DEFLECTOR FOR VEHICLE VENTILATING WINDOWS

Moss Albert Kent, White Plains, N. Y.

Application December 27, 1946, Serial No. 718,781

12 Claims. (Cl. 296—44)

This invention relates to new and useful improvements in automobile ventilator window constructions and has particular relation to a deflector adapted to prevent the movement of moisture along the automobile ventilator window, when open, to the interior of the automobile.

The objects and advantages of the invention will become apparent from a consideration of the following detailed description taken in connection with the accompanying drawing wherein satisfactory embodiments of the invention are shown. However, it is to be understood that the invention is not limited to the details disclosed but includes all such variations and modifications as fall within the spirit of the invention and the scope of the appended claims.

In the drawing:

Fig. 1 is a side elevational view of an automobile ventilating window and surrounding structure, the window being shown in closed position and being equipped with a deflector in accordance with the invention;

Fig. 2 is an enlarged vertical sectional view taken as along the line 2—2 of Fig. 1;

Fig. 3 is a detail sectional view on an enlarged scale and with the ventilating window open, the view being taken along the plane of the line 3—3 of Fig. 1;

Fig. 4 is a side elevational view of the deflector alone;

Fig. 5 is an elevational view of the deflector, the view being taken at right angles to Fig. 4 as looking toward Fig. 4 from the right;

Fig. 6 is an isometric view of the upper portion of the ventilating window and deflector;

Fig. 7 is an elevational view of a slightly modified construction of deflector; and Fig. 8 is a transverse sectional view taken as along the line 8—8 of Fig. 7.

Automobiles, at present, are equipped with ventilating windows which are generally pivotally mounted in frames in doors or bodies of the automobiles for tilting to and from closed positions. These constructions provide for the ventilating of the interior of the automobile without objectionable drafts such as result from the opening of the usual vertically movable windows. When these ventilating windows are tilted or rocked on their vertical pivots to open positions, the structure is customarily such that the forward portion of the ventilating window is within the car body while the rearward portion thereof may extend slightly outwardly of the car body.

With such a construction, when driving in the rain certain air currents set up and cause moisture striking the projecting portion of the ventilating window on its outward side to move across the window toward the forward portion of the ventilating window. Water is thus carried within the vehicle and drips from the window either onto the car upholstery or the clothing of an occupant or the floor and, in any case, is objectionable. To have the ventilating window open is desirable from the view point of health and safety and to prevent fogging of the windshield. Yet the opening of the usual ventilating window while driving in the rain has the result above set forth.

According to the present invention, means are provided to prevent the movement of moisture forwardly across the outer face of an automobile ventilating window whereby such windows may be opened when driving in the rain with the exception of instances in which a hard rain is being driven directly into the side of the vehicle. However, for most purposes, the means of the present invention is effective to prevent the entrance of rain into a vehicle along the outer surface of an open ventilating window of the vehicle.

Referring in detail to the drawing, at 10 is generally indicated a portion of a vehicle, as for example, a portion of a front door of a vehicle, and such portion 10 has therein any or the usual opening, the rearward portion of which is adapted to be closed by a pane of glass 11 which may be vertically movable as is customary. The forward portion of the opening, which for the present purpose is designated 12, is adapted to be closed by means of a ventilating window generally designated 13 and including a pane of glass 14 and a bordering frame generally designated 15 extending about the bottom, forward and top edges of said pane 14.

Preferably, the opening 12 has a liner 16 of rubber or other compressible material which at its forward portion includes a flange or rib 17 arranged to have the frame 15 bear against its inner side when the ventilating window 13 is closed. Upper and lower ribs 18 and 19 are also provided on the liner and are located to be engaged by the inner sides of the rear end portions of the frame 15 when the ventilating window is closed.

As here shown, the ventilating window is mounted by or on upper and lower pivot posts 20 and 21 whereby it is adapted for rocking or tilting movement between closed and open positions. As shown, the frame 15 includes an outer channel shaped or transversely U-shaped metal member 22 and a cushion or padding 23 of compressible material between such transversely U-shaped or channeled member and the glass. As thus far set forth, the construction of the ventilating window is well known in the art and is here illustrated and described as being a conventional structure adapted to be modified according to the present invention and for the purpose hereinabove set forth.

My deflector in Figs. 1-6 is generally designated 25 and the same comprises a rigid elongated body 26 formed of metal or of other suitable material and at its inner side carrying a pair of ribs 27 and 28 which extend along the intermediate portion of the member and are of a length to fit across the pane 14 of the ventilating window at the place where the deflector is to be installed. Between these ribs there is located a length 29 of compressible material, as of relatively soft rubber, and beyond the ends of said ribs the rubber extends at 30 to the upper end of the body 26 and at 31 to a place below or beyond the lower end of said body providing or carrying a laterally extending tab 32 the purpose of which will appear. The rubber described is secured to the body 26 by compression between ribs 27 and 28 or by suitable cement or the like.

In its lower end, the body 26 is provided with an opening 33 into which is inserted an arm 34 of a clip 35 which clip includes a laterally extending arm 36, a vertically extending arm 37, and an inwardly directed hook portion 38 at the upper end of the arm 37. The arm 34 of the clip 35 has its free end portion bent sharply upon itself, as at 39, and the construction is such that to force the bent end of the arm into the opening 33 brings about some flexing of the bent end 39 of the arm. Also, the metal of the clip is preferably considerably harder than the material of body 26 so that when the arm 34 is forced into the opening 33, the bent end 39 of the arm tends to dig into the material of the body 26 to prevent the arm being readily pulled out of the socket 33. In this way, the clip is attached to the body 26 without the use of any special parts or tools. Further, as the arm 34 is forced more or less into the opening 33, the relation of the clip to the body 26 is adjusted.

In its upper end, the body 26 is provided with a socket 40 into which is forced the free end portion of an arm 41 of a clip 42 which also includes a reversedly bent or spring portion 43, an arm 44 substantially parallel with the arm 41 and an inwardly directed hook 45. The wire or ribbon of the material forming the clip 45 is bent upon itself in the arm portion 44 providing an eye or loop 46, the purpose and use of which will be set forth. Arm 41 has a reversedly bent end 47 corresponding to the reversedly bent end 39 of clip 35 and functioning in the socket 40 for the attachment of clip 42 to the body 26 in the same manner that the reversedly bent end 39 of the clip 35 functions in the socket 33 to mount the clip 35 on the body 26.

The outer side or surface 48 of the body 26 is opposite the side carrying the ribs 27 and 28 and as shown is in a plane at approximately 30° to such inner side. Thus, the rear or active edge 49 of the body is of considerably greater thickness than the forward or inactive edge 50 thereof and, as shown, the edge 49 is at a slight angle so as to provide a slight overhang. This may be omitted, if desired, and the edge 49 may be normal to the inner side of the body.

To apply the present deflector to a ventilating window 13, the window is opened and the clip 35 slipped under the lower portion of the frame 15. At this time, the body 26 may be slanted outwardly with respect to the window so as to engage the hook 38 over the upper edge of the inner wall of the lower portion of the channel shaped frame piece 22. Then the deflector 25 is rocked inwardly toward the window causing the clip 35 to take a position around the described frame portion and to bring the rubber portion 31 against the outer side or outer surface of the outer wall of the bottom portion of the U-shaped channel member 22 and to compress such rubber portion.

Further, the rubber portion 29 protruding beyond the ribs 27 and 28 is compressed against the outer face of the pane 14 and the upper rubber portion 30 is forced against the outer surface of the upper portion of the U-shaped channel member 22. During this latter movement, the clip 42 is forced over the upper side of the upper portion of the frame 15 so as to dispose the reversedly bent or resilient portion 43 of the clip against such upper edge of the frame and to dispose the arm 44 of the clip against the inner side of the frame.

Now, any suitable tool, as a nail, ice pick or the like, is inserted through the eye or loop 46 and fulcrumed against the lower edge of the inner wall of the upper portion of the U-shaped frame 22 and used as a pry. This will pull downwardly on the clip and the resilience provided by the reversedly bent portion 43 of the latter permits of a downward movement of the arm 44 so as to engage the hook 45 over the lower edge of the described portion of frame 22. Thus, it will be clear that the hooks 38 and 45 are dug into the resilient liner for the metal part of frame 15. In this way, the deflector 25 is positioned in the ventilating window with the portions 30 and 31 of the rubber seal in tight sealing relation with the outer surfaces of the upper and lower portions of the metal frame and with the rubber portion 29 in tight sealing relation with the glass pane 14 between such frame portions.

The means for attaching the body is practically entirely concealed from the outside of the vehicle when the deflector is in place. Thus, such means does not invite tampering. In addition, the means functions to keep the deflector tight in place so that an effective seal is obtained between the deflector and all parts of the ventilating window, including the frame thereof, and the deflector is readily applied without the use of any special tools and without damage to the vehicle.

When it is desired to close the window 13, the same may be closed in the usual manner since the relatively thin material of the clips 35 and 42 may be readily compressed into the rubber liner 16. As the device is being applied, it will be understood that the arms 34 and 41, of the clips 35 and 42, are pushed into the respective sockets 33 and 40 to the extent required for application to any particular ventilating window.

With the device in place, any moisture attempting to move across or inwardly of the outer end portion of the pane 13 is intercepted by the deflector and flows downwardly at the rear edge of the latter and off the body structure to the outer side of the car body. When the window is open, the lateral projections 32 of the rubber strip is bent, as suggested in Fig. 3, and provides a tail-like portion providing a drip point outwardly of the vehicle so there is no danger of the moisture being carried down the deflector and then inwardly of the vehicle. The present device intercepts any moisture attempting to move inwardly over the upper and lower frame portions as well as that attempting to move forwardly over the pane 14.

Owing to the low angle of incline of the outer surface or wall 48 of the deflector, it will be understood that the same will not act as a wall to catch moisture and feed the same to the interior of the car. Thus, when the ventilating window is open, as in Fig. 3, the incline of the surface 48 is outwardly and rearwardly so that any moisture splattering thereon is not trapped and forced into the interior of the vehicle.

Referring to the modification of Figs. 7 and 8, the same is shown as including a sheet metal body, generally designated 55, and including an inner wall 56 and an outer wall 57 bent at approximately an angle 30° to the wall 56. Between them, these walls define a channel 58 which faces rearwardly when the device is applied to a ventilating window. On the inner surface of the wall 56 there is a body of rubber or the like 59 which is slit at its upper and lower ends, as at 60 and 61. The device of Figs. 7 and 8 is to be applied to a ventilating window through the use of screws or similar devices passing through opening 62.

These openings are provided in both the inner and outer walls of the metal body and to accommodate the screw heads the outer wall has certain portions pressed inwardly as at 63. When applying the device of Figs. 7 and 8, the rubber at the outer side of the slit 60 is cut off at a point to yet leave on the upper end of the body 55 rubber of a size or width to extend across the outer surface of the upper frame portion of a ventilating window. The same act is performed with respect to the rubber at the lower end of the body and at the outer side of the slit 61. Thus, a thinner layer of rubber is left at the end portions of the body 55 for sealing against the outer surfaces of the upper and lower frame portions of a ventilating window while a thicker intermediate portion of rubber is left to engage the glass pane of such ventilating window.

Therefore, a water tight seal is provided across the entire outer surface of the ventilating window including both the pane and the upper and lower frame portions. When a portion of the rubber is removed at the outer side of slit 61, a tail-like portion 64 remains to define a drip point, as described above in connection with the portion 32 of the form shown in Figs. 1–6.

While in the drawing the present rain deflector has been shown and in this specification the same has been described as an attachment for existing vehicles, it will be understood that the invention comprehends the building of the deflector into vehicles at the factory or place of manufacture or assembly. Thus, in the appended claims, it is to be understood that unless the invention is specified as an attachment it is intended that the claims shall be construed as for either an attachment or a built-in structure comprising a permanent part of the vehicle as completed by the manufacturer.

Having thus set forth the nature of my invention, what I claim is:

1. In a deflector for the purpose described, an elongated rigid body adapted to extend across the glass pane and the outer upper and lower surfaces of a frame for said pane, a strip of compressible material on one side of said elongated body and secured thereto, said strip including an intermediate portion to engage a surface of a pane of a ventilating window, end portions of a length to extend across the outer upper and lower surfaces of the frame of said window when said intermediate portion is extended across the pane thereof, said end portions of less thickness than said intermediate portion and of a thickness to be compressed against said frame surface portions when said intermediate portion is compressed against the pane of the window and hooks mounted by the upper and lower portions of said body and adapted to be hooked over the upper and lower portions respectively of the frame of a ventilating window.

2. In a deflector for the purpose described, an elongated rigid body adapted to extend across the glass pane and the outer upper and lower surfaces of a frame for said pane, a strip of compressible material on one side of said elongated body and secured thereto, said strip including an intermediate portion to engage a surface of a pane of a ventilating window, end portions of a length and thickness to extend across and be compressed against the outer surfaces of the frame of said window when said intermediate portion is extended across and compressed against the pane thereof, hooks mounted by the upper and lower portions of said body and adapted to be hooked over the upper and lower portions respectively of the frame of a ventilating window, said body having sockets in its end portions, and said attaching means including arms adapted to be inserted into said sockets and having their end portions bent upon themselves for digging into the walls of the sockets to prevent casual withdrawing of the arms therefrom.

3. In a deflector for the purpose described, an elongated rigid body adapted to extend across the glass pane and the outer upper and lower surfaces of a frame for said pane, compressible material on one side of said body and secured thereto, said material including an intermediate portion to engage the surface of a pane of a ventilating window, end portions beyond the respective ends of said intermediate portion and of a length to extend across the outer upper and lower surfaces of the frame of a window when said intermediate portion is extended across the pane thereof, said end portions of less thickness than said intermediate portion and of a thickness to be compressed against said frame surface portions when said intermediate portion is compressed against the pane of the window, means to secure the ends of said rigid body to said frame, said means adapted to press said body toward said pane and frame and compress said compressible material against and into sealing water-tight relation with the pane and frame, respectively, and a tab on the lower end of said deflector and extending therefrom and providing a drip point.

4. In a deflector for the purpose described, an elongated rigid body adapted to extend across the glass pane and the outer upper and lower surfaces of a frame for said pane, a sealing means on one side of said body and secured thereto and adapted when said deflector is in use to have sealing engagement with a surface of a pane of a ventilating window and with the outer surfaces of the upper and lower portions of a frame for such pane to deflect and direct water moving across the pane and mentioned frame portions, means connected with said body and adapted to pass over the upper and lower edges of the frame of a ventilating window to anchor said deflector in place on said window, and one of said means resilient whereby to maintain a pressure between said sealing means and portions of a pane and frame engaged thereby.

5. In a deflector for the purpose described, an elongated rigid body adapted to extend across a glass pane and the outer upper and lower surfaces of a frame for said pane, means on the inner side of said body and adapted to have sealing engagement with the pane and with the outer upper and lower surfaces of the frame of said pane beyond the exposed portions of the pane and adapted to deflect and direct water moving across the pane and mentioned frame portions, means secured to said body and adapted to pass over the upper and lower edges of the frame of a window to which said deflector is to be applied and adapted to anchor said deflector in place on said window, a hook on one of said means for engagement over the edge of an inner portion of such a frame, said hook carried at the inner end of an arm of said means, and said arm inwardly of said hook provided with a loop for the reception of a pry to be used in engaging said hook over such a frame portion.

6. In a deflector for the purpose described, an elongated rigid body adapted to extend across a glass pane and the outer upper and lower surfaces of a frame for said pane, means on the inner side of said body and adapted to have sealing engagement with the pane and with the outer upper and lower surfaces of the frame of said pane beyond the exposed portions of the pane and adapted to deflect and direct water moving across the pane and mentioned frame portions, means secured to said body and adapted to pass over the upper and lower edges of the frame of a window to which said deflector is to be applied and adapted to anchor said deflector in place on said window, and one of said means of a wire including a portion reversedly bent on itself whereby to give the wire resilience to permit of passing of the means over an edge portion of a window frame and for the purpose of maintaining a pressure between said sealing means and the pane and outer frame portion of a window over an edge of which said means has been passed.

7. In a deflector for the purpose described, an elongated rigid body adapted to extend across a glass pane and the outer upper and lower surfaces of a frame for said pane, means on the inner side of said body and adapted to have sealing engagement with the pane and with the outer upper and lower surfaces of the frame of said pane beyond the exposed portions of the pane and adapted to deflect and direct water moving across the pane and mentioned frame portions, means secured to said body and adapted for passing over the upper and lower edges of the frame of a window to which said body may be applied and adapted for anchoring said body in place on said window with said sealing means across the pane of the window and the outer surfaces of the upper and lower portions of the frame of such window, and a hook on each of said means for hooking over the edges of the upper and lower frame portions respectively of such a window.

8. In a deflector for the purpose described, an elongated rigid body adapted to extend across the glass pane and the outer upper and lower surfaces of a frame for said pane, a strip of compressible material on one side of said elongated body and secured thereto, said strip including an intermediate portion to engage a surface of a pane of a ventilating window, end portions of a length to extend across the outer upper and lower surfaces of the frame of said window when said intermediate portion is extending across the pane thereof, said end portions of less thickness than said intermediate portion and of a thickness to be compressed against said frame surface portions when said intermediate portion is compressed against the pane of the window, and said body in transverse section including an inner side carrying said compressible strip and an outer side arranged at an angle substantially less than ninety degrees to said inner side.

9. In a deflector for the purpose described, an elongated rigid body adapted to extend across the glass pane and the outer upper and lower surfaces of a frame for said pane, a strip of compressible material on one side of said elongated body and secured thereto, said strip including an intermediate portion to engage a surface of a pane of a ventilating window, end portions of a length to extend across the outer upper and lower surfaces of the frame of said window when said intermediate portion is extending across the pane thereof, said end portions of less thickness than said intermediate portion and of a thickness to be compressed against said frame surface portions when said intermediate portion is compressed against the pane of the window, and said compressible strip extending substantially below the lower end of said rigid body to provide a drip point by folding against an adjacent frame portion when the deflector is not in use.

10. In a deflector for the purpose described, an elongated rigid body adapted to extend across the glass pane and the outer upper and lower surfaces of a frame for said pane, a strip of compressible material on one side of said elongated body and secured thereto, said strip including an intermediate portion to engage a surface of a pane of a ventilating window, end portions of a length to extend across the outer upper and lower surfaces of the frame of said window when said intermediate portion is extending across the pane thereof, said end portions of less thickness than said intermediate portion and of a thickness to be compressed against said frame surface portions when said intermediate portion is compressed against the pane of the window, and said body comprising a piece of sheet metal folded longitudinally upon itself with said compressible strip against a surface of one fold and with the other fold at an angle substantially less than ninety degrees to the first fold.

11. In a deflector for the purpose described, an elongated rigid body adapted to extend across the glass pane and the outer upper and lower surfaces of a frame for said pane, means on the inner side of said body and adapted when said body is in position on a window to have sealing engagement with the pane of such window and to deflect and direct water moving across the pane of such window, means on said body and adapted to pass over the upper and lower edges of a frame about such a pane and for anchoring said deflector to such window, and one of said means resilient whereby to maintain a pressure between said sealing means and portions of said window with which said sealing means is brought into engagement on the mounting of the deflector on such window.

12. In a deflector for the purpose described, an elongated rigid body adapted to extend across the glass pane and the outer upper and lower surfaces of a frame for said pane, means on the inner side of said body and adapted when said body is in place on a window to have sealing engagement with the pane of said window and with the outer surfaces of the upper and lower portions of the frame of said window beyond the exposed portions of the pane thereof and to deflect and direct water moving across the pane and mentioned frame portions, means for anchoring one end of said body to the frame of a window to which said deflector is applied, and a hook-like means on said body and adapted to pass about the edge of a frame of such window remote from that to which the first end of the body is anchored and adapted thereby to anchor the other end of said body to such a window frame.

MOSS ALBERT KENT.

REFERENCES CITED

The following references are of record in the file of this patent:

UNITED STATES PATENTS

| Number | Name | Date |
|---|---|---|
| 2,263,860 | Schell | Nov. 25, 1941 |